Aug. 30, 1927.
J. B. ADDUCI
SHOCK ABSORBER
Filed Feb. 27, 1926
1,640,340
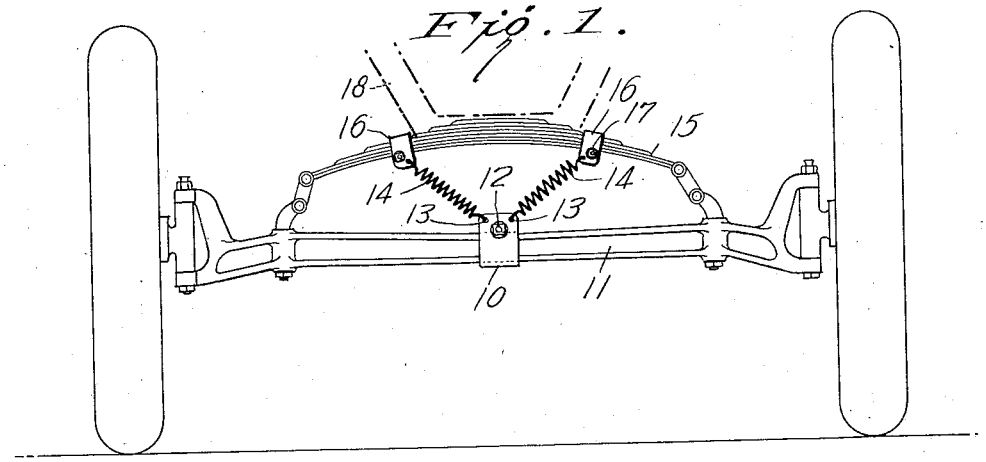
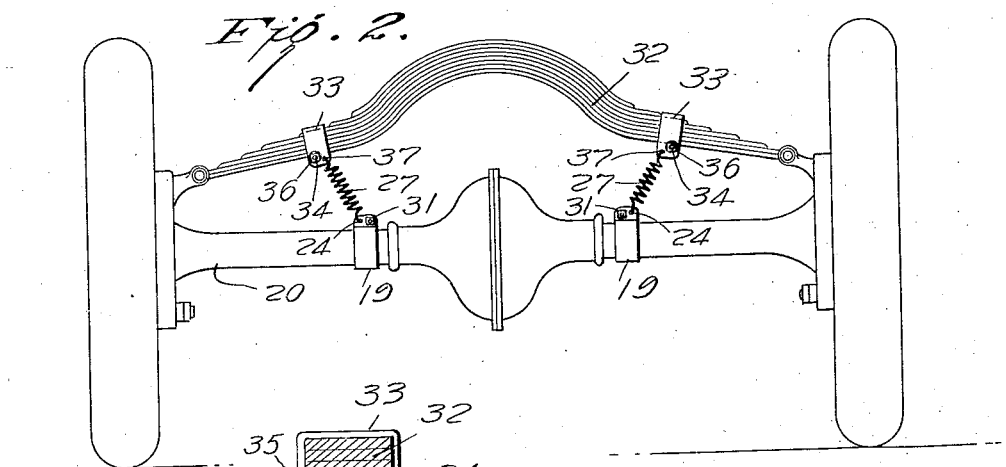
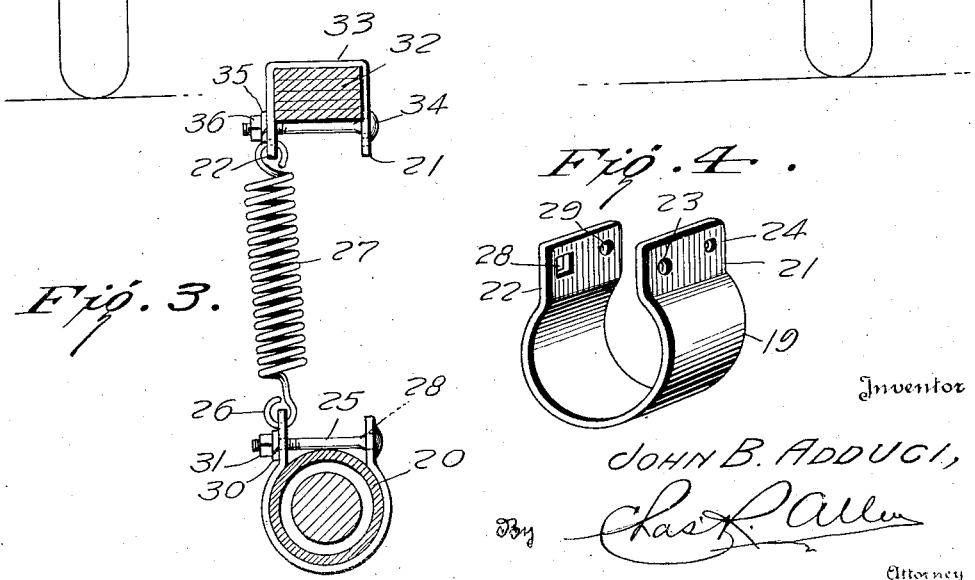
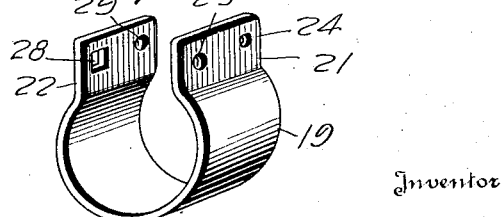
Inventor
JOHN B. ADDUCI,
By Chas R. Allen
Attorney

UNITED STATES PATENT OFFICE.

JOHN B. ADDUCI, OF BOSTON, MASSACHUSETTS.

SHOCK ABSORBER.

Application filed February 27, 1926. Serial No. 91,087.

My invention relates to shock absorbers for automobiles and has for an object to provide a very simple and inexpensive and highly efficient accessory that may be readily attached to both the front and rear springs of an automobile and easily removed.

The scope of my invention extends to whatever constructions may be defined by or included within the terms or language of the appended claim.

In the drawing:

Figure 1 is an elevation of a front wheel assembly illustrating the application of my invention thereto;

Figure 2 is a similar view showing the rear wheel assembly with my improved shock absorbing device mounted in its operative position.

Figure 3 is a detail sectional view taken on the line 3—3 of Figure 2, and

Figure 4 is a view in perspective of one of the clamping members associated with the rear axle.

My invention, in the form or embodiment shown in the drawing and briefly described, comprises, a clamping member, which is attached to a relatively stationary portion of an automobile, a clamping member secured to the leaf springs of the automobile and coil springs connected between these clamps.

Referring now with particular reference to Figure 1 of the accompanying drawing, a substantially U shaped clamp, 10, is secured to the approximate center of the front axle, 11, by means of carriage bolt or a similar device, 12. A pair of openings, 13, are provided near the upper end of the front end of the clamp, 10, for the purpose of receiving the lower looped ends of the coil springs, 14.

Securely mounted upon the leaf springs, 15, is a pair of substantially U shaped members, 16, which are held in their clamped position upon the springs, 15, by means of carriage bolts or the like, 17. These inverted U shaped clamps or clips, 16, are, of course, sufficiently spaced apart to remain clear of the spring supporting frame or saddle, 18, indicated by dotted lines. The coil springs, 14, converge downwardly, and are, of course, connected between the upper inverted U shaped clips, 16, and the lower centrally disposed U shaped clamp, 10.

Referring now to Figure 2, it will be seen that I provide a pair of relatively stationary clamps, 19, on the axle housing, 20. The body portion of the clamps, 19, are preferably rounded so as to readily conform to the contour of the rear axle housing, 20, and are provided on their upper or open end with a pair of upwardly extending ears, 21 and 22, so that they may be readily clamped upon or removed from the axle housing, 20. A pair of oppositely disposed openings, 23 and 24, are formed in the upwardly extending flange, 21, of the clamp, 19, for the purpose of receiving respectively the outer end of the clamping bolt, 25, and the lower end, 26, of a coil spring, 27. The opposite and vertically extending flange, 22, of the clamp, 19, is also provided with a pair of openings, 28 and 29, which are adapted to align with the openings, 23 and 24. The opening, 28, is preferably formed square for the reception of the squared portion of the carriage bolt or like fastening device, 25, so as to prevent its rotation therein or accidental displacement when assembled. The clip, 19, is securely clamped upon the housing, 20, by means of the usual spring washer and nut, 30 and 31.

Suitably clamped upon the rear leaf springs, 32, is a pair of substantially inverted U shaped clips, 33, which are held in their proper location by means of the carriage bolt, 34, together with spring washers and nuts, 35 and 36. Openings, 37, are formed near the lower ends of the downwardly depending side portions of the clips, 33, for the purpose of receiving the upper end of the coil springs, 27. The coil springs, 37, of the rear wheel assembly preferably converge downwardly, as do the coil springs of the front wheel assembly, for the purpose of and tending to centrally retain the leaf springs with respect to their associated axles.

It will be noted that each lip of each clamp is formed with an opening in which the terminal of the spring may be secured. Thus if but one spring is used it may, through the use of one or the other set of openings, be made to act in line with the front or rear of the load spring; though it is obvious that by the provision of two openings, two springs may be used if desired.

Although I have illustrated but a single spring, 27, connecting each of the clamps, 19, and 33, it is, of course, to be understood that an additional coil spring may be interposed between the oppositely disposed flange, 28, and the aligning flange of the clamp, 33.

I claim:

A shock absorber for automobiles, comprising clips to removably embrace the axle and leaf spring of an automobile, each of said clips having two lips each formed with two openings, a bolt for each clip and cooperating with an opening of each lip to secure the clip in place with the lips in spaced parallel relation whereby to arrange the remaining and free openings of the clip on opposite sides of the automobile part to which it is connected, and a coil spring having terminals to be loosely engaged with either free opening of the respective clips, whereby to vary the absorbing effect of the spring at will without loosening the clips.

JOHN B. ADDUCI.